United States Patent [19]

Petersen et al.

[11] Patent Number: 4,677,640
[45] Date of Patent: Jun. 30, 1987

[54] CRYSTALLINE QUARTZ LASER WINDOW ASSEMBLY

[75] Inventors: Alan B. Petersen, Palo Alto; Robert C. Rempel, Los Altos; Joseph B. Lastovka, Sunnyvale; David F. Head, Mountain View; Lee R. Carlson, Pleasanton, all of Calif.

[73] Assignee: Spectra-Physics, Inc., San Jose, Calif.

[21] Appl. No.: 779,538

[22] Filed: Sep. 24, 1985

[51] Int. Cl.⁴ .............................................. H01S 3/08
[52] U.S. Cl. .................................. 372/103; 372/108; 372/99
[58] Field of Search .................. 372/103, 105, 99, 98, 372/108, 61

[56] References Cited

U.S. PATENT DOCUMENTS

| | | | |
|---|---|---|---|
| 3,790,900 | 2/1974 | Golser | 372/105 |
| 4,064,466 | 12/1977 | Seki et al. | 372/107 |
| 4,349,908 | 9/1982 | Hara et al. | 372/107 |

OTHER PUBLICATIONS

Joiner et al, "Elimination of Stress-Induced Birefringence Effects in Single Crystal High Power Laser Windows", Appl. Phys. Lett., 30(9), 1 May '77.

*Primary Examiner*—Leon Scott, Jr.
*Attorney, Agent, or Firm*—Donald C. Feix; Paul Davis; T. M. Freiburger

[57] ABSTRACT

A window assembly for a laser uses a uniaxial crystalline material such as quartz for the window, secured directly in a hard seal to a metal tubular end component. In order to avoid significant differential thermal expansion between the quartz window and the end component, the quartz crystal is cut in a Z-normal configuration, whereby the thermal expansion and other physical properties of the window are isotropic in the plane of the window. The ability to make a reliable direct seal to a metal component offsets any disadvantages of the Z-normal configuration thought to be controlling in the prior art. Through the disclosed method for assembling and mounting the window, reflection loses are reduced to a practical minimum comparable to that of any preferred conventional window orientation.

24 Claims, 23 Drawing Figures

| TIME | 1 | 2 | 3 | 4 | 5 |
|---|---|---|---|---|---|
| PHASE | 360°,0° | 90° | 180° | 270° | 360° |

E-WAVE ORIENTATIONS

FIG. 12a

O-WAVE ORIENTATIONS

CRYSTALLINE QUARTZ LASER WINDOW ASSEMBLY

BACKGROUND OF THE INVENTION

The invention relates to lasers, and more particularly to lasers utilizing uniaxial crystalline quartz windows secured directly to a metal component in a hard seal.

The use of crystalline quartz or other transmissive crystalline materials such as sapphire as end members for laser tubes is known. See, for example, Wright et al. U.S. Pat. No. 4,063,803, assigned to the same assignee as the present invention. Crystalline quartz has been found to be advantageous over isotropic material such as fused silica because of its superior transmissivity and low absorption. With fused silica, ultraviolet emissions within the laser tube have tended to darken the window, producing an absorption which results in thermal heating of the window. Therefore, not only was power lost through absorption, but further degradation of the beam would occur from undesirable changes in the window's optical properties due to thermal gradients from the heating of the window.

The use of crystalline quartz as a window material, however, has carried certain disadvantages. Single-crystal quartz is not isotropic in all directions. In particular, its thermal expansion properties are not the same in all directions within the material. Single-crystal quartz has a specific atomic arrangement defined by three unique axes generally identified as X, Y and Z or A, B and C axes, all at right angles to each other. In single-crystal quartz, directional properties such as thermal expansion are the same along two of the three axes, namely X and Y (or A and B). However, directional properties are quite different in the Z (or C) direction. Single-crystal quartz thus has only one unusual axis and is said to be "uniaxial".

Materials to be hard sealed together, as by glass frit bonding, in a laser window assembly, must generally have closely matched thermal expansion coeffieients, since considerable change in temperature is experienced at the window assembly. Differences of about $10^{-7}$ $°c^{-1}$ in thermal expansion coefficients between two materials at fritting temperature are generally regarded as undesirable, especially when one or both materials are brittle and prone to fracture.

When joints between highly mismatched materials are unavoidable, one member of the pair has conventionally been made structurally weak to accommodate the differential expansion, such as by using thin wall tubing. The weak member is reversibly or permanently deformed as the joint is cooled, without producing stress levels that could damage the joint or the mating part. In other words, the weak member is "forced" to expand and contract by deformation at the rate set by its stronger partner, and such a joint is sometime called a "forced" or "compliant" seal. Such a seal has conventionally been a solution used in crystalline quartz window assemblies.

There are certain considerations regarding reflection losses and birefringence at laser windows that have dictated that the unusual or Z axis lie in the plane of the window. Therefore the X and Z axes, or Y and Z axes, have been placed in the plane of the window to minimize losses, in accordance with conventional thinking. The reasons for this conventional preference to have the Z axis in the plane of the window will be further discussed below.

As a consequence of this conventional type of crystalline quartz window mounting, the window when heated has tended to expand unevenly, i.e. a different degree of expansion along the Z axis as compared to the X axis, with both being in the plane of the window. Therefore, the window has frequently been secured, as by glass frit bonding, to a tubular endbell component member of crystalline quartz, as an alternative to the compliant seal discussed above. In such a seal, the crystalline axes of the endbell component are in the same orientation as that of the crystal window. The window and attached end component therefore tended to expand and contract together.

The crystalline quartz tubular endbell component had to be secured in a sealed connection to another endbell component, leading ultimately to the ceramic laser plasma tube. This was usually done with a hard seal, which could be accomplished with glass frits, brazes or deformable metal gaskets. The latter can be used successfully, but require some form of clamp to compress the gasket, resulting in a rather large and cumbersome seal assembly. Therefore, a crystalline quartz tubular endbell member was often sealed in a compliant seal connection, by frit bonding, to an adjacent tubular component of somewhat malleable material, such as thin walled silver. Such connections were not mechanically strong.

It is a principal object of the present invention to form an improved laser window structure involving a crystalline quartz window with radically different crystalline orientation, enabling a simpler joint to be made to a tubular end component of matched-expansion metal.

SUMMARY OF THE INVENTION

In accordance with the present invention, a window assembly for a laser includes at least one endbell assembly at an end of the laser, the endbell having a tubular end component cut obliquely at its outer end substantially at Brewster's angle, and with a window of uniaxial crystalline material secured in a hard seal on each tubular end component.

Each window has its Z axis or C axis substantially in Z-normal configuration, so that thermal expansion and other physical properties of the window are substantially isotropic in the plane of the window. Each tubular end component is substantially matched in coefficient of thermal expansion to the crystalline material in the plane of the window. Each window is oriented so that polarization of the laser's beam is approximately in the plane of incidence with respect to the window. In one embodiment, two laser windows are employed and have their planes of incidence approximately aligned, but rotated through "barrel roll" to tune window reflection losses to a minimum.

The angle alpha between the planes of incidence of the two windows will normally be non-zero, but near zero, for minimum reflection losses at this crystalline axis orientation.

The invention also encompasses a method for mounting a window assembly on a laser, and for minimizing reflection losses at the window(s) and absorption at the window(s) while maintaining a substantially matched thermal expansion between the window(s) and endbell assembly component to which it is secured.

The method includes forming each window of a uniaxial crystalline material such as quartz with the unusual or Z axis of the crystal substantially at Z-normal, i.e. normal to the plane of the window surface, so that thermal expansion and other physical properties of the crystalline quartz window are isotropic in the plane of the window. An endbell assembly is provided at an end of the laser operatively associated with a window which includes a tubular end component terminating in an outer end substantially at Brewster's angle, the end component having a coefficient of thermal expansion generally matched to that of the crystalline quartz in the plane of the window. The end component preferably is of metal.

In accordance with the method a crystalline quartz window is secured to the outer end of an end component in a hard seal, prior to completion of the assembly of the endbell onto the laser.

The method of the invention includes acceptance of inevitable imperfections in (a) the thickness of the window, (b) the orientation of the crystalline axes precisely at Z-normal, (c) Brewster's angle orientation of the window, (d) perfect planar mounting of the window on the end component, (e) alpha alignment of the planes of incidence of the window and another polarization determining component, resulting in some R versus alpha reflection loss and some birefringence and consequent polarization rotation, (f) polarization rotation in the laser's optical gain medium, and (g) optical activity due to the Z axis being at non-ideal orientation.

With these inevitable imperfections accepted, the window and other polarization component are oriented with respect to the laser so that the polarization of the laser's beam is approximately in the plane of incidence of the window and polarization component, and the laser is adjusted by rotating the tubular end component in barrel roll with respect to the beam polarization in a final degree of freedom before the endbell assembly is fixed. This enables the achieving of substantially the minimum possible reflection loss, by shifting birefringence and other related effects to near zero reflection while minimizing R versus alpha S-wave component reflection loss by tuning near the alpha-zero position.

Therefore, absorption at the windows is minimized by the use of crystalline quartz, while differential thermal expansion is minimized at the window mountings by the Z-normal orientation and isotropic expansion substantially matched to the end component, and while reflection losses are held to a practical minimum comparable to other minimal-loss crystalline axis mounting orientations used in the prior art.

Accordingly, it is among the objects of the present invention to solve crystalline quartz window assembly mounting and sealing problems by adopting an unusual crystal axis orientation not contemplated in the prior art and which was a disfavored and seemingly unacceptable orientation in the prior art, while still keeping losses at a practical minimum comparable to what was achieved by other crystalline orientations in the prior art. These and other objects, advantages, features and characteristics of the invention will be apparent from the following description of a preferred embodiment, considered along with the accompanying claims.

DESCRIPTION OF PREFERRED EMBODIMENTS

In the drawings, Figs. 1a through 1d show in exploded schematic view a series of alternative end constructions for a laser, in accordance with the principles of the invention. All of Figs. 1a through 1d involve these same principles, but each shows a slightly different construction.

In each case, a window of uniaxial crystalline material is cut and applied to the laser in Z-normal configuration, and secured, as by a glass frit joint, to an adjacent tubular component which will undergo approximately the same degree of thermal expansion along the plane of the window. The window is isotropic in thermal expansion within its own plane, due to the fact that the crystalline material is uniaxial and is in Z-normal configuration, and this expansion is matched as closely as possible to the expected thermal expansion of the adjoining element.

Figure 1A:
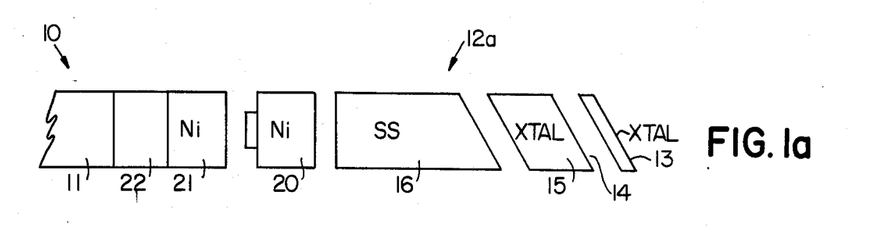
FIGS. 1a through 1d are schematic exploded views in elevation generally indicating the mounting of a crystalline quartz window at one end of a laser tube.

In the embodiment of Fig. 1a, a portion of a laser 10 is shown, including a plasma tube 11 which is normally of ceramic material. An endbell assembly 12a is to be secured to the end of the plasma tube, with a window 13 to be secured to the end 14 of the endbell assembly.

The window is secured, preferably by glass frit bonding, to a tubular end component 15 which is also of uniaxial crystalline material in the embodiment of Fig. 1a, examples of such crystalline material being crystalline quartz and sapphire. Crystalline quartz is generally preferred, and the following discussion often identifies the material as crystalline quartz. However, throughout this disclosure it will be appreciated that uniaxial crystalline quartz is disclosed as only one embodiment of the invention, and the scope of the invention is not limited to crystalline quartz. Other uniaxial crystalline materials may be employed.

In Fig. 1a the uniaxial crystalline tubular end component 15 is cut to have the same crystalline orientation as the window 13, i.e. "Z-normal" at the plane of the end 14. The component 15 is cut to orient the window 13 at Brewster's angle, which is well known to produce zero reflection from the window surfaces for light polarized precisely in the plane of incidence of the window.

In Fig. 1a the crystalline end component 15 is connected to a controlled expansion stainless steel component 16. The mating surfaces are at Brewster's angle, parallel to the end surface 14, so that at the plane of contact between the crystalline component 15 and the stainless steel component 16, the crystal 15 experiences isotropic thermal expansion. The components 15 and 16 may be bonded together by glass frit bonding.

The stainless steel component 16 is matched as closely as possible in thermal expansion properties to the isotropic plane of expansion of the uniaxial crystalline component 15 and the window 13. Controlled expansion stainless steel alloys which may advantageously be used are high expansion alloys 18-11 and 22-3, available from Carpenter Technology Corporation, Reading, Pennsylvania. Stainless steel experiences isotropic thermal expansion in substantially all directions and the thermal expansion of the stainless steel component 16 and the crystalline component 15 will be approximately matched for the temperature ranges with which the laser 10 is concerned.

Figure 1B:
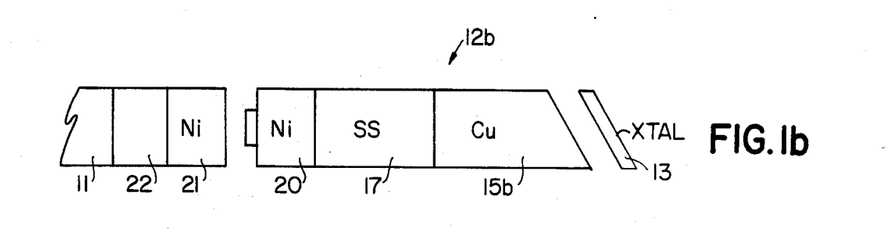
Figure 1C:
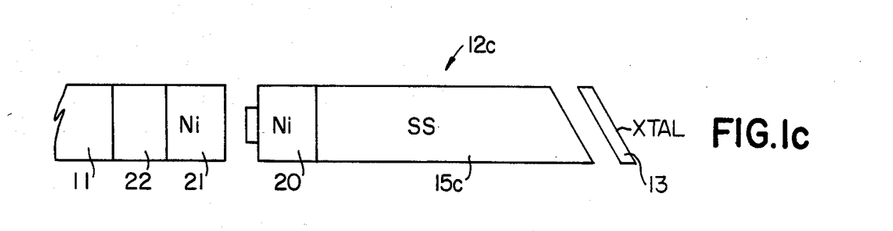
Figure 1D:
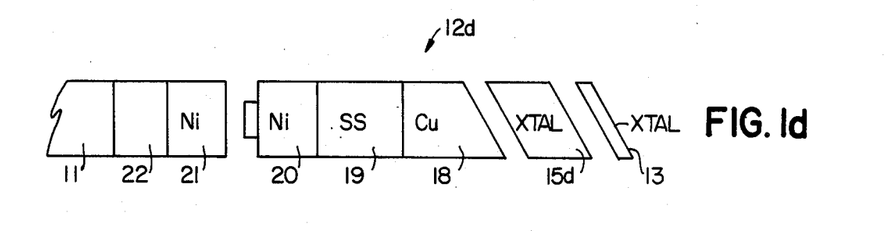

In Figs. 1b through 1d, somewhat different arrangements of components are shown. The window 13 of uniaxial crystalline material is still bonded, which may be by glass frit bonding, to an adjacent tubular end component 15 at Brewster's angle, with the window in Z-normal configuration. However, in Fig. 1b the window is bonded to a tubular copper component 15b, while in Fig. 1c it is bonded to a stainless steel tubular component 15c, and in Fig. 1d it is bonded to a tubular piece 15d of similar uniaxial crystalline material, as in Fig. 1a.

The copper component 15b if Fig. 1b is substantially matched in thermal expansion in the concerned range to the thermal expansion of the crystalline window 13 in the plane of the window. It is then, in turn, connected to a tubular stainless steel piece 17, preferably by a high-temperature brazing. The stainless steel piece 17 is of an alloy which will approximately conform in thermal expansion to the copper component 15b.

In Fig. 1d the arrangement is similar to Fig. 1a, except that the crystalline end component 15d, cut at Brewster's angle, is secured to a piece of copper tubing 18, rather than to a stainless steel piece 16 as in FIG. 1. Again, the thermal expansion properties of the copper piece 18 and the crystalline end component 15, in the Brewster's angle plane, are generally matched. As above, the two components 18 and 15d may advantageously be secured together by glass frit bonding.

The copper component 18 in Fig. 1d is secured to a tubular piece of stainless steel 19, which may be in a right-angled joint, by a high-temperature braze. The stainless steel piece 19 may be of an alloy similar to that identified for the component 16 in Fig. 1a, having approximately similar thermal expansion properties to the copper piece 18.

The end assembly 12a, 12b, 12c or 12d in Figs. 1a through 1d may be connected in an efficient manner to the plasma tube 11 of the laser 10. Since a final degree of freedom is desirable so as to permit "barrel roll" of the end assembly 12a, 12b, 12c, 12d, i.e. rotaton about the axis of the tubular assembly 12a, 12b, 12c, 12d, it is advantageous to include a stainless steel component as the rear member of the assemblies just described. Thus, in each of FIGS. 1a through 1d, a stainless steel member 16, 17, 15c or 19 is shown. These components, as shown in the drawings, are connected in a high-temperature brazed joint to a cylindrical section 20 of nickel. The nickel section 20 may in turn abut against another nickel section 21, which is connected in a high-temperature braze joint to another stainless steel section 22, the section 22 being secured to the ceramic plasma tube 11 as by a high-temperature braze.

This enables the two nickel sections 20 and 21 to be connected in a low-temperature braze joint in the final assembly, after rotational adjustment of the end assembly 12a by barrel roll as further discussed below. The final low-temperature braze joint will not disturb the already formed higher temperature joints.

One advantage of the end assembly construction shown in FIGS. 1a and 1d, using a tubular end component 15 or 15d of uniaxial crystalline material with properties similar to those of the window 13, is an electrical insulation. In the final brazing operation in the assembly of the laser, as described above, there is a need to grip the end assembly while making the rotational "barrel roll" adjustment just described. While the end assembly is gripped, it should be held via an electrically insulated portion. The relatively thin window 13 provides little area for insulative gripping of the end assembly, and the intervening crystalline tubular piece 15 or 15d aids in this function.

Figure 4:
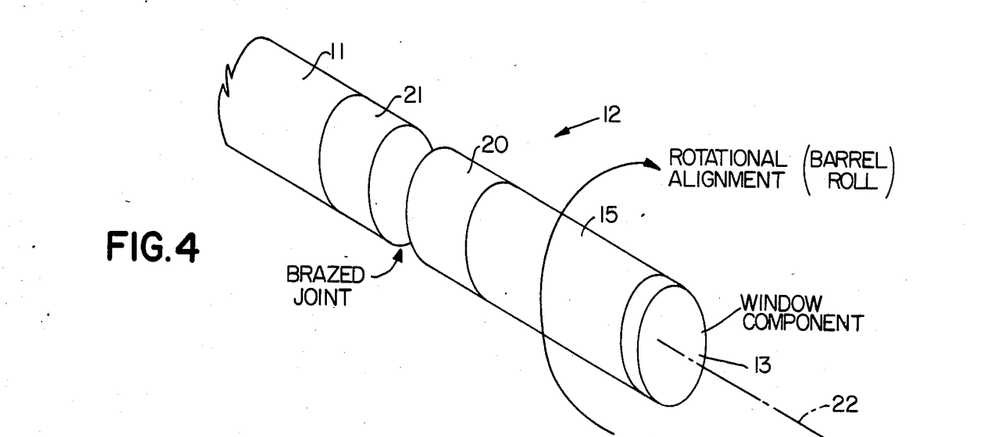
FIG. 4 is a schematic view in perspective illustrating an assembly of endbell components to the end of a laser tube, to illustrate "barrel roll".

FIG. 4 illustrates in a schematic view the final "barrel roll" adjustment of the laser end assembly 12 with respect to the plasma tube 11. The rotational position of the end component (i.e. 12a, 12b, 12c, or 12d) is "tuned" in accordance with principles described below, with a reference beam 22 passing through the window 13, before the final low-temperature braze is made between the nickel sections 20 and 21.

It should be understood that other suitable means for bonding the various components together may be employed. For example, the uniaxial crystalline window 13 may be secured to an immediately adjacent metal component such as the components 15b and 15c of copper and stainless steel, respectively (FIGS. 1b and 1c, by brazing rather than glass frit bonding. This is accomplished by first metallizing the crystalline window in an area near its periphery, enabling it to be brazed to the copper or stainless end component in a high-temerature braze.

Figure 2:
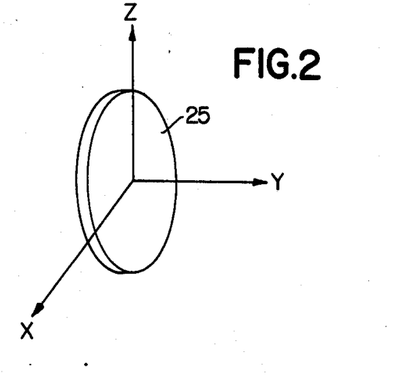
FIG. 2 is a representation in perspective indicating three orthogonal crystalline axes X, Y and Z of a crystalline quartz window, with the Z axis oriented in the plane of the window.
Figure 3:
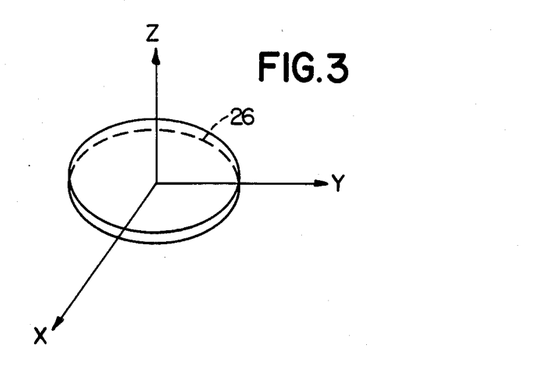
FIG. 3 is a representation similar to FIG. 2, but with the Z axis of the quartz oriented perpendicular to the plane of the window, in Z-normal configuration.

FIGS. 2 and 3 illustrate considerations involved in selection of crystalline quartz (or other uniaxial crystalline material) axis orientations in laser windows. In FIG. 2 a disk 25 has been cut out of crystalline quartz such as the X and Z axes lie in the plane of the disk. Thermal expansion of the crystalline quartz disk in the X and Z directions are not the same, since the crystalline quartz is uniaxial and the Z axis is defined as the unusual axis. Thermal expansion along the Z axis is approximately half the expansion along the X axis. Therefore the disk 25, initially circular at room temperature, becomes relatively elongated along the X axis as temperature increases, and takes on an elliptical shape. Because the X and Z expansions of quartz (or Y and Z expansions) are widely different, there is no isotropic seal partner that can simultaneously be an adequate match to both directions. As discussed above, seals in such circumstances have been made by "forcing" the joint, with a structurally weak partner forced to deform with temperature changes.

In FIG. 3 a disk 26 of the same uniaxial crystalline quartz is cut with the Z axis normal to the plane of the disk. Therefore, expansion in the plane of the disk is isotropic, only the Z axis expansion being at a different rate. As the disk expands with changes in temperature, it will remain circular.

The expansion of crystalline quartz in the X-Y plane is large. However, there exist a number of adequately matching seal partners for bonds made in the 300 degrees C. to 600 degrees C. range. For crystalline quartz these include copper, 304 stainless steel and a variety of specialty stainless steel alloys.

Endbell-laser tube seals with this same general geometry can also be made by substituting frit glass for the brazed metal and by using 42 alloy or other similar material in place of any nickel parts.

Exemplary frit glasses include S657, sold by Owens Illinois, Inc., Toledo, Ohio and 7575 sold by Corning Glass Works, Corning, New York which are particularly suitable in use with high expansive stainless steel alloys 18-11 and 22-3, respectively.

In order to obtain maximum performance from an ion laser, the intracavity optical components, including the window(s), must be of very high optical quality and must be very precisely aligned. Misalignment causes increased reflection of the laser beam from the optical surfaces, resulting in decreased laser output power, unnecessary heating of laser cavity components and other undesirable effects.

Figure 5:
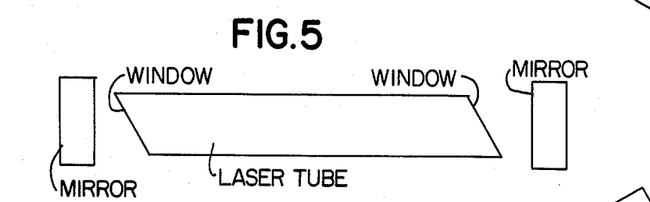
FIG. 5 is a schematic view of one embodiment of the present invention illustrating a two-window laser.
Figure 6:
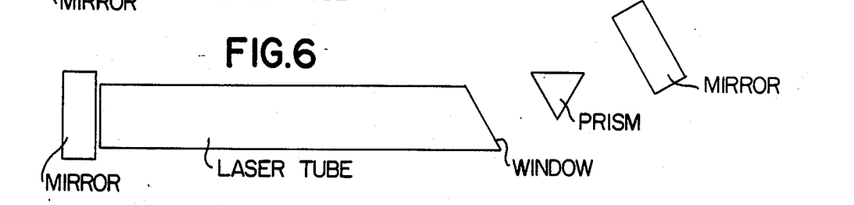
FIG. 6 is a schematic view of a second embodiment of the present invention illustrating a one window laser including a distinct second polarizer such as a prism.

The present invention encompasses lasers having either two windows or one window, as illustrated in FIGS. 5 and 6 respectively.

In FIG. 5 two crystalline quartz windows 27 and 28 are disposed at opposing ends of the laser tube 11. In another embodiment shown in FIG. 6 one crystalline quartz window 29 is employed, operatively associated with another polarization element 30, which may comprise (but is not limited to) a prism.

To illustrate the factors of alignment of the uniaxial material the following discussion is included and has particular application in the embodiment illustrated in FIG. 5, with the two windows as polarization-determining elements. However, the alignment factors associated with the embodiment illustrated in FIG. 6 are qualitatively similar but not as complex.

For several important reasons which have been well known, crystalline quartz is a desirable material for laser windows. However, optical alignment of such window(s) within a laser cavity is a very complex theoretical and experimental problem. The discussion herein is non-mathematical, and certain simplifications have been made.

Figure 7:
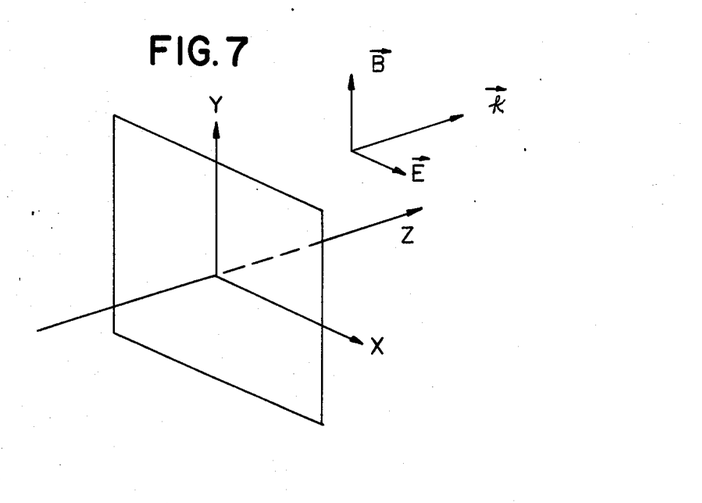
FIG. 7 is a schematic view illustrating a laser beam and its direction vector, electric field polarization vector, and magnetic field vector.

Laser light is an electromagnetic wave characterized by an electric field, a magnetic field and a propagation direction. The electric and magnetic fields can be viewed as disturbances fluctuating rapidly in time, with each field having a magnitude and a direction at any given instant. In the coordinate system of FIG. 7, the direction of propagation is represented by the k vector, taken to be in the plus Z direction. The electric and magnetic fields are represented by the E and B vectors, respectively, shown in the XY plane. These three vectors are always mutually orthogonal in free space.

Figure 8A:
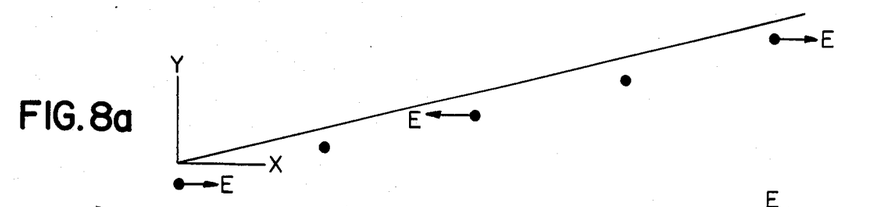
FIGS. 8a, 8b and 8c are representations of laser polarization vectors and the effects of shifts in phase and summation of two phase-shifted vector components.
Figure 8B:
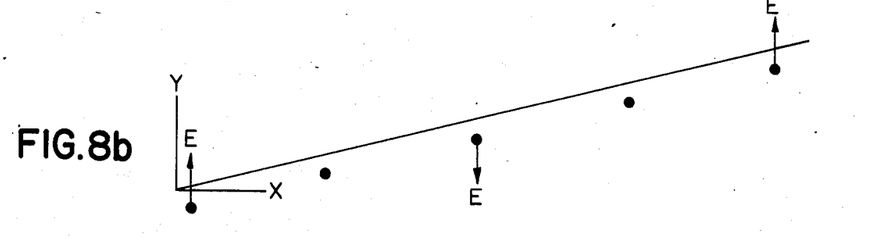
Figure 8C:
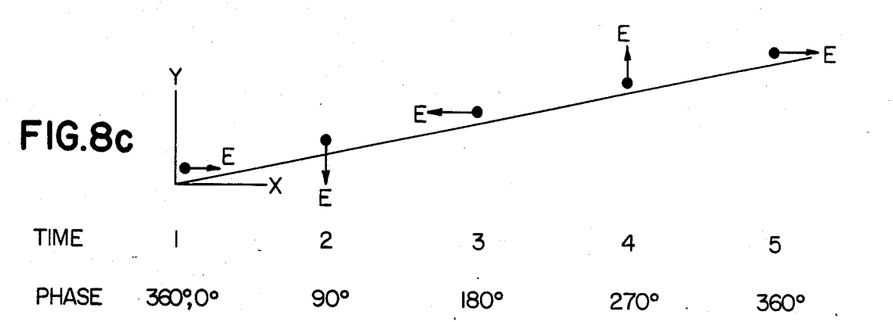

Since the fields vary rapidly in time, their vector representations move rapidly in magnitude and direction within the XY plane. Simple periodic motions are illustrated in FIGS. 8a, 8b and 8c. In FIG. 8a the electric field, i.e. the E vector, oscillates between the plus X and the minus X directions, referred to as linear polarization in the X direction.

The situation in FIG. 8b is entirely analogous, except that the electric field orientation and therefore the polarization is in the Y direction. However, in FIG. 8c the electric vector moves in a circle rather than back and forth, referred to as right-hand circular polarization (clockwise). All of these conditions are special cases of a more general condition known as elliptical polarization, wherein the end of the electric vector traces out an ellipse in the XY plane.

The concept tying all this together is that of vector amplitude and phase. The E vectors in FIGS. 8a and 8b have equal amplitude and phase, i.e. they are equally strong and their relative motions are synchronized. If they were added, using the laws of vector addition, the result would be a different vector 1.41 times as long and oscillating back and forth in a direction midway between the X and Y axes.

However, if the phase of one of the vectors is shifted relative to the other by 90 degrees, or ¼ cycle, the result after adding will be a circular polarization vector which rotates as in FIG. 8c. Any simple periodic vector motion can be obtained by summing linear polarization vectors in the X and Y directions and adjusting their amplitude and phase appropriately. Also, any linear polarization can be made up of two properly selected elliptical (or circular) polarization vectors.

Figure 9:
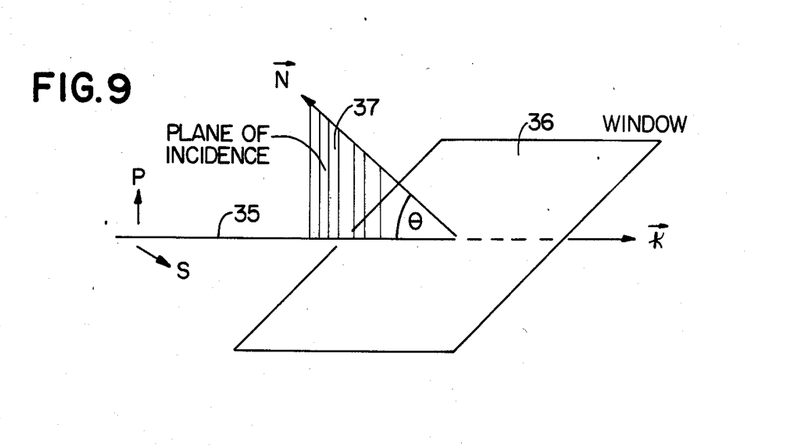
FIG. 9 is another schematic view, illustrating a laser beam passing through a window, and the plane of incidence formed between the laser beam and the normal to the window surface.

When a laser beam 35 encounters a window 36, as illustrated in FIG. 9, it forms an angle theta of incidence with the plane of the window. The plane 37 established in space by the propagation direction k of the beam 35 and the window surface normal vector N is defined as the plane of incidence. Generally, a fraction of the incident beam will be reflected from each surface of the window, the size of the fraction depending upon the angle theta and the polarization direction of the incident beam. However, at Brewster's angle, a particular angle theta, and for light polarized precisely in the plane of incidence, the reflection from each surface is zero, these being ideal conditions.

Light polarized in the plane of incidence is conventionally known as the P-polarization, or P-wave. Light polarized perpendicular to the plane of incidence is termed the S-wave. The S-wave light still suffers a reflection (roughly 10%–20%), even at Brewster's angle.

Since laser operation requires that window reflections and other losses be minimized, lasers are generally constructed with windows at Brewster's angle and with a P-polarized output beam.

When two windows are required on a laser tube, as in the present invention, the problem of reflection at the windows is greatly complicated. In the schematic view of FIG. 10, two laser windows 36a and 36b are indicated, both mounted precisely at Brewster's angle in the path of a laser beam 35. Both windows 36 are assumed identical in thickness and composition, and all quantum interference effects are ignored. The windows are assumed to be formed of an isotropic material, such as fused silica, having no special optical properties depending on the direction of light propagation material.

Figures 10, 11, 12A, 12B, 14A:
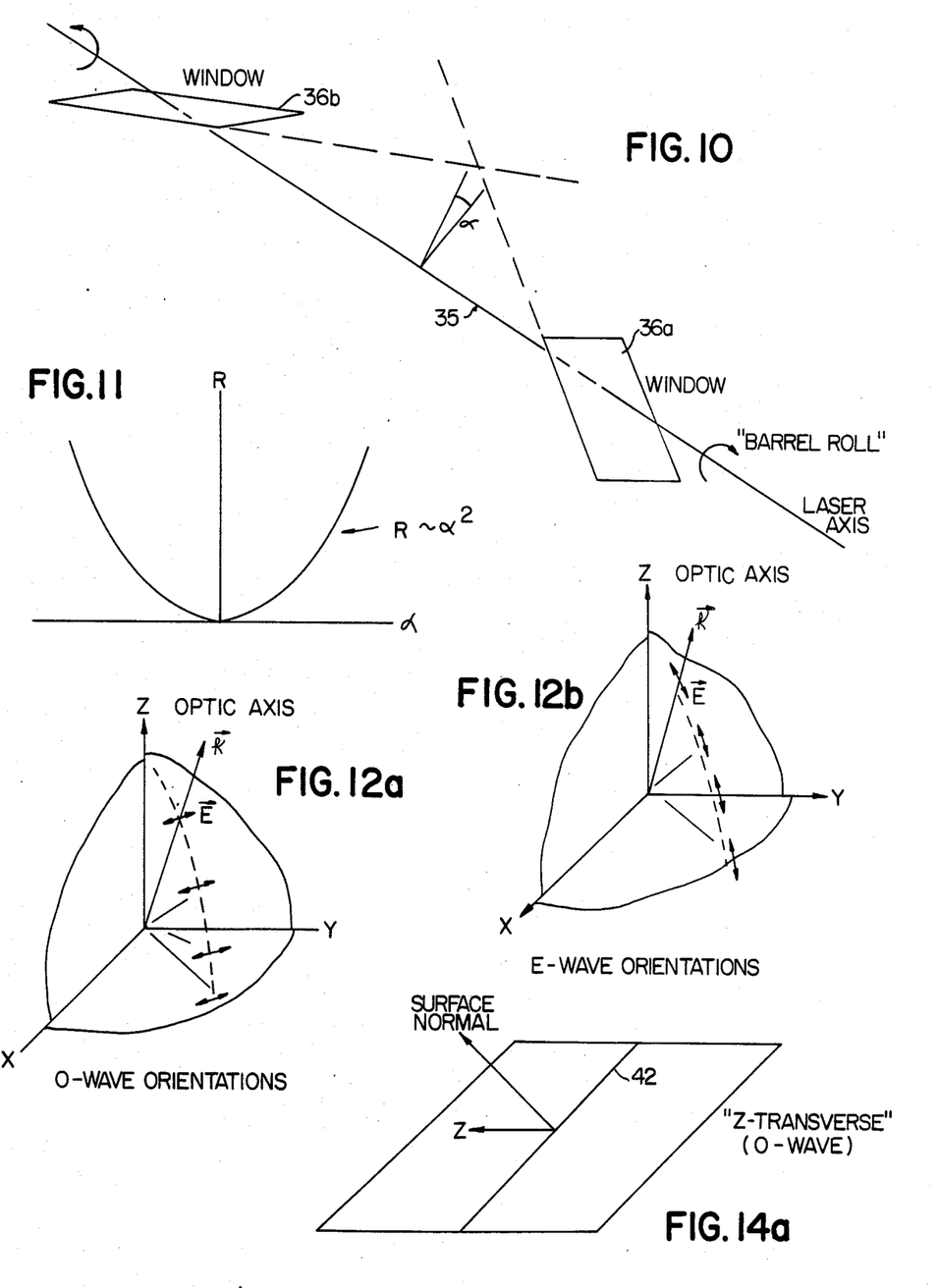
FIG. 10 is a schematic view illustrating two laser windows at Brewster's angle, and the effect of "barrel roll" between the planes of incidence of the two windows, forming an angle alpha between the two planes of incidence.
FIG. 11 is a graph of reflection loss versus the barrel roll angle alpha.
FIG. 12a is a schematic representation showing a laser beam passing through a piece of crystalline quartz, and the resulting 0-wave orientation when the laser beam's polarization is as illustrated.
FIG. 12b is a view similar to FIG. 12a, showing the E-wave orientation resulting from a different illustrated polarization orientation.
FIG. 14a is a schematic view showing a Z-transverse crystalline axis orientation in a laser window, which will produce 0-wave orientation when the beam is P-polarized.

If the windows 36a and 36b are perfectly aligned with respect to each other, their planes of incidence are identical and there will be no reflection of P-polarized light from any of the surfaces. However, if one window is rotated slightly with respect to the other about the laser beam 35 axis, then reflections will be non-zero.

This misalignment, shown as the alpha in FIG. 10, is referred to as "barrel roll" rotation. If the two windows of FIG. 10 are inside a laser cavity and the gain medium itself is isotropic, then the laser polarization will be free to establish itself at the minimum reflection condition. By symmetry, this will be linear polarization halfway between the planes of incidence of the two misaligned windows. The laser beam 35 will suffer reflection on each window because each window will interpret the laser polarization with respect to its own plane of incidence. The laser beam will act like the sum of two linear polarizations, a large P-wave component and a small S-wave component (refer also to FIG. 9). The P-component will be transmitted, while the S-component will be partially reflected.

From vector algebra, the magnitude of the S-component will vary with $\sin^2$ alpha, which for small alpha is proportional to alpha$^2$. Thus, the reflection losses from the two windows will have the dependence shown in the graph of FIG. 11, with S-component reflection loss R rising parabolically on either side of alpha zero.

Window alignment is further complicated when non-isotropic materials are considered. Crystalline quartz, a non-isotropic material, is a uniaxial crystal having one unusual or special axis, its optic axis or Z-axis as discussed above. Light passing through the crystal structure is treated differently depending on its direction of propagation and polarization relative to the optic axis.

FIGS. 12a and 12b show the three crystalline axes X, Y and Z of crystalline quartz. Essentially linearly polarized light with its polarization oriented as shown in FIG. 12a is known as the "ordinary wave" or 0-wave. I.e., the polarization, represented by the E vector in FIG. 12a, is perpendicular to the plane formed by the laser beam (the k vector) and the optic axis Z.

Light polarized as shown in FIG. 12b, i.e. polarized in the plane formed by the laser beam and the optic axis Z, is known as the "extraordinary wave" or E-wave.

In passing through the quartz crystal, the 0-wave and the E-wave each experience a different index if refraction. The so-called "ordinary index" in $N_o$ is constant for all propagation directions. The "extraordinary index", $N_e$ is essentially equal to $N_o$ for propagation along the optic axis Z, and increases slowly to a value about 0.6% higher for propagation perpendicular to the optic axis. This can be envisioned with reference to the 90 degree envelope of E-wave orientations shown in FIG. 12b. This dual index of refraction phenomenon is referred to as "birefringence".

The index of refraction is basically a measure of the optical "density" of a material. The higher the value of N, the slower a light wave will propagate through the material. Light waves experiencing different values of N will "slip" in phase with respect to each other as they pass through the material, and this is what happens in crystal quartz. If a laser beam is incident on a crystalline quartz window, it will generally (under non-perfect conditions) be broken up into an E-wave and an 0-wave. These two components will travel at slightly different rates and the result will be phase "slippage" and a polarization change.

Figure 13:
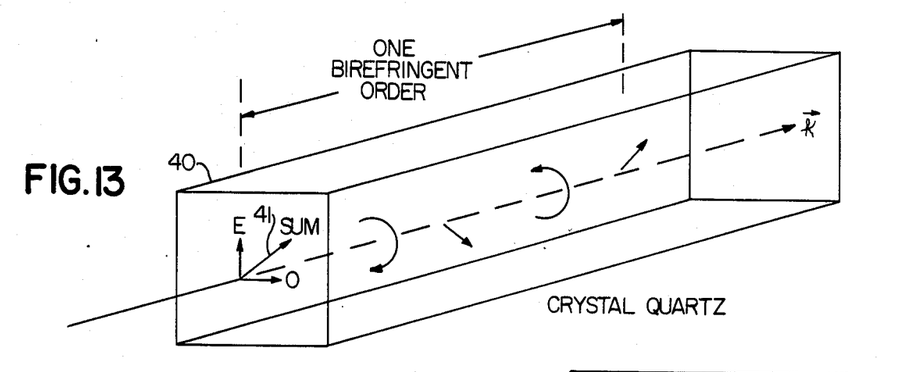
FIG. 13 is a schematic view illustrating a block of crystalline quartz and the polarization rotation associated with birefrigence.

In FIG. 13 is indicated a long slab of crystalline quartz 40 through which are assumed to be propagated an 0-wave and an E-wave of equal strength, indicated by the orthogonal vectors E and 0 and their sum vector 41 at the entrance to the slab of quartz 40. As the two waves move through the crystal their phases will slip with respect to each other. At some point the E wave will have been retarded by 90 degrees and the two waves will now add to form elliptical polarization, circular here because the two waves are of equal strength. The two components sum as indicated above in reference to FIG. 8.

Twice as far into the crystal, the E-wave will have slipped by another 90 degrees, and the waves will again add to form linear polarization, but in a direction perpendicular to the original. Farther into the crystal, the waves will form circular polarization, but of the opposite handedness. Finally, a position will be reached where the waves have slipped one full period (one wave length), and the original polarization is restored.

The thickness of material over which this cycle occurs is calculable, generally a few thousandths of an inch. In a practical piece of quartz, this phase retardation cycle can occur many times. The number of these complete cycles is referred to as the "birefringent order" of the optical component.

Although useful for some optical applications, this polarization rotation is unacceptable in ion laser windows, since a particular linear polarization must in general be maintained throughout the system to achieve minimum reflection losses. A condition must be found wherein a pure P-wave incident on each window is also a pure 0-wave or E-wave within the window and is therefore preserved.

Figure 14B:
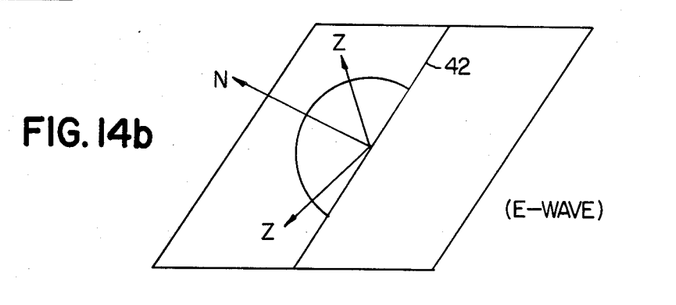
FIG. 14b is a view similar to FIG. 14a, showing a group of crystalline optic axis orientations which will result in E-wave orientation when the beam is P-polarized.

Windows satisfying these requirements are illustrated in FIGS. 14a and 14b. In FIG. 14a, the optic axis Z is in the plane of the window and normal to the plane of incidence, which cuts through the window along a line 42 in FIG. 14a and includes the window normal vector N. This crystalline axis orientation is referred to as "Z-transverse" or ("C-transverse"). As can be envisioned from FIG. 12a, discussed earlier, the Z-transverse optic axis orientation will sustain a pure 0-wave. This is because a P-polarized light beam (polarization in the plane of incidence) will have its polarization perpendicular to the plane between the beam and the optic axis Z.

In FIG. 14b, the optic axis Z is in the plane of incidence (including any orientation of Z within the plane of incidence in FIG. 14b). This results in a pure E-wave, since the P-polarized light beam will be polarized in the plane formed between the beam and the axis Z, as in FIG. 12b.

Two special cases of importance with respect to FIG. 14b are Z normal to the surface (along the normal N), and Z at the intersection of the plane of incidence and the window surface (i.e. on the line 42 in FIG. 14b). These two cases are known as "Z-normal" and "Z-longitudinal", respectively.

As an ideal situation, suppose that two crystalline quartz windows could be fabricated with their optic axes precisely aligned as in FIG. 14a or as in FIG. 14b, and that the windows could be mounted at the exact Brewster's angle condition of FIG. 10, with alpha=0. The resulting system would have zero reflection losses for P-polarized light. However, if alpha is non-zero as it inevitably will be, then the windows will have reflection loss, since the beam will have an S-wave component at each window. For non-zero alpha, each window surface will interpret the incident wave as the sum of S and P components and will partially reflect the S component.

Furthermore, since the windows are crystalline quartz and exhibit birefringence, the S and P components will be phase shifted with respect to each other in each window, resulting in polarization rotation and increased reflection. If both windows were of identical thickness, and that thickness were an exactly integral birefringent order at Brewster's angle, then there would be no net polarization rotation in either window, even under misaligned conditions. The windows would therefore behave as if they were isotropic, and the R versus alpha dependence would be the same as that for fused silica windows, as illustrated in FIG. 11.

Although it is possible to make two windows very nearly equal in thickness, that thickness is rarely an exactly integral birefringent order at all laser operating wavelengths of interest. As the misalignment angle alpha is increased (increased barrel roll), the effective thickness of each window will change due to refraction. The amount of polarization rotation will therefore change. This effect, combined with the varying S-wave component as the windows are barrel-rolled, gives rise to an R versus alpha dependence something like that illustrated in FIG. 15.

Figures 15, 16:
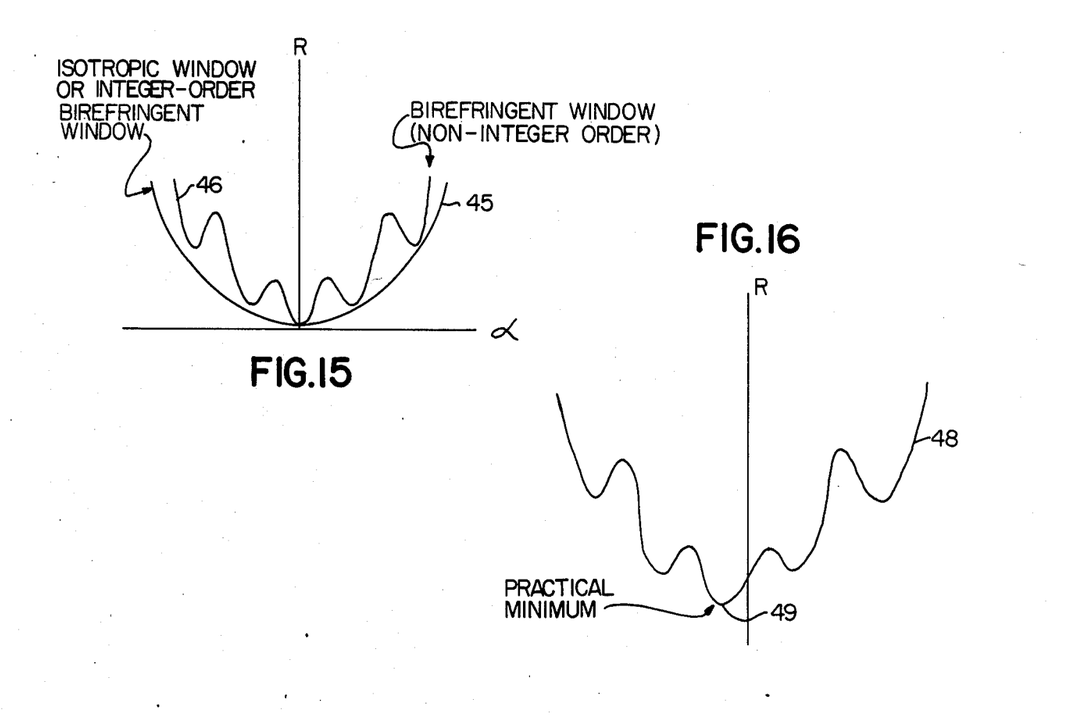
FIG. 15 is a graphic representation similar to that of FIG. 11, plotting reflection loss versus the angle alpha, but showing the effects of birefringence in addition to normal R versus alpha loss.
FIG. 16 is a graph similar to FIG. 15, but showing the shifting of the curve due to other factors and imperfections in the laser assembly, resulting in a non-zero practical minimum to reflection loss.

FIG. 15 shows two curves, a first parabolic curve 45 similar to the curve of FIG. 11, for an isotropic window or an integer-order birefringent window. The second curve 46 is for a birefringent window of non-integer order.

The curve 46 of FIG. 16 still passes through zero at alpha=0. It would be possible to rotate the windows for zero reflection loss, provided this must occur precisely at alpha=0, were it not for a number of other residual effects.

In practice, there is always a slight error in crystalline axis orientation when the laser window is fabricated.

Another practical imperfection is that the Brewster's angle mounting is never perfect. Since, as is conventional and in keeping with the present invention, only the "barrel roll" degree of freedom is left as a final degree of freedom in mounting the windows on the laser tube, these various errors can never be zeroed out entirely. Furthermore, there is often some polarization rotation in the optical gain medium. Still further, the window itself may suffer very slight strain-induced birefringence from stresses associated with its mounting.

There is one additional effect which degrades the precision with which one can align crystalline quartz laser windows. This effect is optical activity and it is peculiar to crystal quartz and a very few other materials. Basically, optical activity is a small perturbation to the birefringent properties of a uniaxial crystal as herein described. The values of $N_o$ and $N_e$ are altered very slightly, and the special 0-wave and E-wave which propagate unchanged through the crystal are no longer linearly polarized but are slightly elliptical. For propagation along the optic axis, the 0-wave and E-wave are right-hand and left-hand circularly polarized light, respectively, for right-handed quartz.

The result of this optical activity phenomonon is increased polarization rotation for light passing through the crystal, which adds further problems in laser window mounting. Optical activity dictates that in the design of a window to transmit an E-wave, as in FIG. 14b the direction of propagation must be kept well away from the optic axis. Even well away from this direction there is some net rotation, due to optical activity, although in practice it is rather small.

When optical activity and the other residual effects are taken into account, window reflection losses will never go to zero. However, a minimum condition can still be found using barrel roll adjustment (as indicatd in FIG. 10). The angular dependence is likely to look like the curve 48 of FIG. 14. The practical minimum point 49 will inevitably be at a non-zero point of alpha. As a practical matter, the practical minimum will always be within about 5 degrees of alpha-zero, since any increase in alpha beyond that point will tend to raise reflection losses too high due to simple R versus alpha dependence, i.e. losses due to S-component reflection as in the simple case of FIG. 11.

In the design of a laser window, comparing the possible crystalline axis orientations of FIGS. 14a and 14b, there may be some slight theoretical advantage to the Z-longitudinal orientation (one of the family of orientations of Z shown in FIG. 14b), since in this condition the optical activity of the crystal is very nearly zero.

However, in accordance with the present invention, the practical advantages of window sealing in the Z-normal configuration, as discussed above, far outweigh any benefits of the Z-longitudinal configuration. With the Z-normal orientation and the steps contemplated by the present invention, reflection losses can be brought to a practical minimum comparable to what has been achievable in practice with preferred conventional crystalline axis orientations.

Therefore, in accordance with the invention, it is recognized that crystalline axis orientation, window alignment, Brewster's angle mounting, etc., can never be achieved perfectly in practice. It is recognized that the inevitable errors and inprecisions in these and other respects will move reflection losses significantly far above zero that comparable minimum losses can be achieved by the method and system of the invention involving a radically different crystalline axis orientation not contemplated and thought to be totally unfavorable according to conventional thinking of the prior art. At the same time, this unconventional orientation, the Z-normal orientation, provides very important and considerable practical advantages in the mounting of the window and the assembly of the endbell of the laser, as discussed previously.

Accordingly, in the laser window system of the invention, it is accepted that the P-wave will not be pure because there will inevitably be: (1) some alpha misalignment, causing some simple R versus alpha loss and some birefringence and therefore some polarization rotation; (2) a slight error in crystalline axis orientation; (3) imperfect Brewster's angle mounting; (4) some polarization rotation in the optical gain medium of the laser; (5) a slight strain-induced birefringence in the window mounting; (6) some variation from precise integral birefringent order of thickness of the windows; and (7) some optical activity, Z-normal not being the best orientation in this respect.

With these considerations in mind, the window is mounted in the Z-normal configuration and barrel roll is left as a final degree of freedom in the assembly of the two endbells of the laser. The laser is "tuned", in dynamic fashion by the use of a reference polarized light beam, by barrel roll of the two windows with respect to each other and with respect to the laser tube itself, to shift birefringence reflection effects to near zero, as in FIG. 16, while maintaining S-wave component reflection at a minimum by tuning near the alpha-zero position.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

We claim:

1. A window assembly for a laser, comprising:
    an endbell at an end of the laser, including a tubular metal end component cut obliquely at its outer end substantially at Brewster's angle,
    a window component including a window of uniaxial crystalline material secured to the metal end component on said oblique cut by a hard seal,
    the window component having its axis substantially in Z-normal configuration, so that thermal expansion of the window component is substantially isotropic in the plane of the window, said metal end component being substantially matched, in coefficient of thermal expansion to the crystalline material in the plane of the window.

2. The window assembly of claim 1, wherein the window component comprises the window and a tubular section of said uniaxial crystalline material with two ends cut parallel and substantially at Brewster's angle, both the windows and the tubular section being at the Z-normal orientation, the window being secured to one end of the tubular section and the other end of the tubular section being secured to the metal end component.

3. The window assembly of claim 1, wherein the window component comprises the window, which is secured directly to the metal end component.

4. A laser window assembly according to claim 1, wherein the metal end component is of copper.

5. A laser window assembly according to claim 1, wherein the metal end component is of stainless steel.

6. A laser window assembly according to claim 1, wherein the hard seal comprises a glass frit joint.

7. A laser window assembly according to claim 6, wherein the metal end component is 18-11 stainless steel and the glass frit joint comprises S6-57 frit.

8. A laser window assembly according to claim 6, wherein the metal end component is 22-3 stainless steel and the glass frit joint comprises 7575 frit.

9. A laser window assembly according to claim 1, wherein the opposite end of the metal end component is brazed in a first higher-temperature braze to a tubular nickel section, which in turn is brazed in a final, lower-temperature braze to another nickel section leading ultimately to a plasma tube of the laser.

10. A laser window assembly according to claim 9 wherein the metal end component is stainless steel.

11. A laser window assembly according to claim 1, wherein the laser includes a polarization-determining component in addition to the window, and wherein the window has a barrel roll orientation such that polarization of the laser's beam is approximately in the plane of incidence with respect to the window, and such that window reflection losses are tuned to a minimum.

12. A laser window assembly according to claim 1, wherein the laser is a two-windowed laser, including two of said window components, each window having a barrel roll orientation such that polarization of the laser's beam is approximately in the plane of incidence with respect to the window, the two windows having their planes of incidence approximately aligned, but rotated through barrel roll to tune reflection losses to a minimum.

13. A laser window assembly according to claim 1, wherein the uniaxial crystalline material is crystalline quartz.

14. A laser window assembly according to claim 1, wherein the uniaxial crystalline material of the window component has metallized areas for mating with the metal end component, and wherein the window component is brazed to the metal end component.

15. A laser window assembly according to claim 1, wherein the window component comprises the window and a tubular section of said uniaxial crystalline material with two ends cut parallel and substantially at Brewster's angle, both the window and the tubular-section being disposed intermediate the window and the metal end component, the window and the tubular section having metallized areas and being connected together and to the metal end component by brazing.

16. A laser window assembly according to claim 1, wherein the uniaxial crystalline material is sapphire.

17. A method for mounting a window assembly on a laser and for minimizing reflection losses at the window while maintaining a substantially matched thermal expansion between the window and the endbell assembly component to which it is secured, comprising,
    forming a window component, including the window, of uniaxial crystalline material, with a Z axis of the crystal normal to the plane of the window surface, so that thermal expansion the uniaxial crystalline window are isotropic in the plane of the window,
    forming an endbell assembly component of metal, having a coefficient of thermal expansion generally matched to that of the uniaxial crystalline material in the plane of the window, and
    securing the crystalline window component to the outer end of the endbell assembly component in a hard seal, prior to completing assembly of the endbell onto the laser, whereby absorption is minimized by the use of crystalline material for the window, and differential thermal expansion is minimized at the window mountings by the Z-normal orientation and isotropic expansion substantially matched to the endbell assembly component.

18. The method according to claim 17, wherein the metal endbell component is of 22-3 stainless steel and the hard seal is a glass frit seal using 7575 glass frit.

19. The method according to claim 17, wherein the hard seal comprises a glass frit joint.

20. The method according to claim 17, wherein the metal endbell component is of 18-11 stainless steel and the hard seal is a glass frit joint using S6-57 glass frit.

21. The method according to claim 17, wherein the metal endbell component is of copper.

22. The method according to claim 17, wherein the window component has metallized areas and is secured to the endbell component by brazing.

23. The method according to claim 17, wherein the uniaxial crystalline material is crystalline quartz.

24. The method according to claim 17, wherein the uniaxial crystalline material is sapphire.

* * * * *